(12) United States Patent
Rashidinejad et al.

(10) Patent No.: US 11,416,324 B2
(45) Date of Patent: Aug. 16, 2022

(54) TECHNIQUES FOR ACCURATELY ESTIMATING THE RELIABILITY OF STORAGE SYSTEMS

(71) Applicant: Oracle International Corporation, Redwood Shores, CA (US)

(72) Inventors: Paria Rashidinejad, Berkeley, CA (US); Navaneeth Jamadagni, South San Francisco, CA (US); Arun Raghavan, San Francisco, CA (US); Craig Schelp, Vancouver (CA); Charles Gordon, Davis, CA (US)

(73) Assignee: Oracle International Corporation, Redwood Shores, CA (US)

( * ) Notice: Subject to any disclaimer, the term of this patent is extended or adjusted under 35 U.S.C. 154(b) by 66 days.

(21) Appl. No.: 15/930,779

(22) Filed: May 13, 2020

(65) Prior Publication Data

US 2020/0371855 A1 Nov. 26, 2020

Related U.S. Application Data

(60) Provisional application No. 62/852,167, filed on May 23, 2019.

(51) Int. Cl.
*G06F 11/07* (2006.01)
(52) U.S. Cl.
CPC .......... *G06F 11/079* (2013.01); *G06F 11/076* (2013.01); *G06F 11/0727* (2013.01)
(58) Field of Classification Search
CPC ... G06F 11/079; G06F 11/0727; G06F 11/076
See application file for complete search history.

(56) References Cited

U.S. PATENT DOCUMENTS

| 7,184,932 | B1 | 2/2007 | Lopez et al. | |
|---|---|---|---|---|
| 2017/0123883 | A1* | 5/2017 | Hall | G06F 11/0727 |
| 2021/0124521 | A1* | 4/2021 | Jiang | G06N 20/00 |
| 2021/0208962 | A1* | 7/2021 | Guo | G06F 11/008 |

OTHER PUBLICATIONS

A. Epstein, E. K. Kolodnerand D. Sotnikov, "Network Aware Reliability Analysis for Distributed Storage Systems," 2016 IEEE 35th Symposium on Reliable Distributed Systems (SRDS), 2016, pp. 249-258, doi: 10.1109/SRDS.2016.042.*

* cited by examiner

*Primary Examiner* — Matthew M Kim
*Assistant Examiner* — Kyle Emanuele
(74) *Attorney, Agent, or Firm* — Hickman Becker Bingham Ledesma LLP

(57) ABSTRACT

Techniques are described herein for accurately measuring the reliability of storage systems. Rather than relying on a series of approximations, which may produce highly optimistic estimates, the techniques described herein use a failure distribution derived from a disk failure data set to derive reliability metrics such as mean time to data loss (MTTDL) and annual durability. A new framework for modeling storage system dynamics is described herein. The framework facilitates theoretical analysis of the reliability. The model described herein captures the complex structure of storage systems considering their configuration, dynamics, and operation. Given this model, a simulation-free analytical solution to the commonly used reliability metrics is derived. The model may also be used to analyze the long-term reliability behavior of storage systems.

22 Claims, 11 Drawing Sheets

TECHNIQUES FOR ACCURATELY ESTIMATING THE RELIABILITY OF STORAGE SYSTEMS

CROSS REFERENCE TO RELATED APPLICATIONS; BENEFIT CLAIM

This application claims the benefit of Provisional Appln. 62/852,167 filed May 23, 2019, the entire contents o which is hereby incorporated by reference as if fully set forth herein, under 35 U.S.C. § 119(e).

FIELD OF THE INVENTION

The present invention relates to computer systems and, more specifically, to techniques for accurately estimating the reliability of storage systems.

BACKGROUND

A "storage system" is any system responsible for storing the data used by a computer system. Because the data in the storage systems store can be extremely valuable (e.g. the balances of bank accounts) and/or extremely sensitive (e.g. medical information, private correspondence), it is crucial that such storage systems be reliable. The loss or corruption of even a small amount of data may have enormous consequences.

The world is producing more data than ever. It has been predicted that the total amount of data on earth, the global datasphere, will grow exponentially fast reaching 163 zettabytes of data by the year 2025. More than 70% of these data are expected to be stored in large-scale storage systems in enterprise and cloud data centers. There are many challenges involved in designing such large storage systems, chief among which is storing data reliably. It has been suggested that the average data loss incident costs over $5 million for a corporation in the United States. Data loss incidents can be catastrophic when they involve critical data such as customer information, employee data, medical records, and control systems data.

Some cloud storage providers report an annual durability of at least 11 9's (0.99999999999), whereas some recent studies suggest that such large-scale data storage systems may have much smaller annual durability. Data durability is the probability that data are safely retained in the system over a specified time span. System configurations, such as total storage capacity, life expectancy of storage devices, network bandwidth, and data resiliency schemes—data replication or erasure coding—affect data durability. Moreover, durability is affected by the maintenance policies used for handling storage systems over time. Examples include device retirement, where a near end-of-warranty storage device is safely replaced with a new device, and capacity growth, where the total storage capacity is increased by adding more storage devices over time. Therefore, an accurate calculation of data durability requires taking system configuration and maintenance policies into consideration.

Characterizing reliability of a storage system has been in focus of researchers for the past couple of decades. Efforts have been made to analytically compute reliability metrics. Due to the complexity of the problem, researchers employed models based on unrealistic assumptions such as exponential failure and recovery distributions and Markov models. These models are known to highly overestimate the system reliability. Other works used a series of approximations to estimate mean time to data loss and are not able to compute more useful reliability metrics such as durability. Unfortunately, mean time to data loss does not serve as a good reliability metric to accurately compare the reliability of different systems and it does not reflect the impact of data loss in real world. To this day, a simulation-free analytical solution to calculate reliability that abstracts the complex structure of a storage system does not exist.

One common approach to avoid the complexity of theoretical computation is to use simulation for estimating the reliability metrics. However, existing simulation-based methods suffer from a few limitations that make them impractical. First, simulation-based methods fall short of providing an explicit formula revealing the exact relationship between reliability and system parameters. In addition, existing sequential simulation methods require high computational time to estimate the reliability metric for each specific set of parameters. One needs to run the experiments each time from the beginning to compare reliability under different system configurations. Furthermore, computing more useful reliability metrics, such as annual durability, is computationally intractable using simulation. For instance, cloud storage systems often aim to achieve annual durability of eleven 9's, i.e. $10^{-11}$ probability of data loss in a given year. A very large number of simulations is needed to obtain a statistically accurate estimation on such low probability events.

There are several other factors that cause overestimation of the reliability. While typical models assume exponential storage device failure distribution with a constant failure rate, recent simulation-based approaches use distributions such as Weibull, which allow the failure rate to change over time. Nonetheless, none of the existing works use a statistically accurate approach to derive failure distribution from real data. These works rely on annual failure rate (AFR) collected in storage systems or device mean time to failure (MTTF) reported by the manufacturer to obtain failure distribution parameters. In addition to device failure distribution, maintenance policies such as device retirement and capacity growth are overlooked in existing works, which can have a large impact on reliability.

Another existing issue is that studies thus far have not verified their methodology and results through alternative approaches, and discrepancies exist between different sources. Verification of the results using empirical measurements is not possible at this point. A large enough data set on data loss events does not exist and is not practical to obtain as it requires running a system and recording events after many years of operation. As a result, another form of result verification is needed.

Given how critical it is for storage systems to be reliable, it is important to have an accurate methodology of estimating the reliability of any given storage system. Unfortunately, existing techniques for estimating the reliability of storage system, which often use a series of approximations to derive the reliability metrics, produce highly optimistic (and thus inaccurate) reliability metrics. Therefore, there is a critical need for more accurate techniques for estimating the reliability of storage systems.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
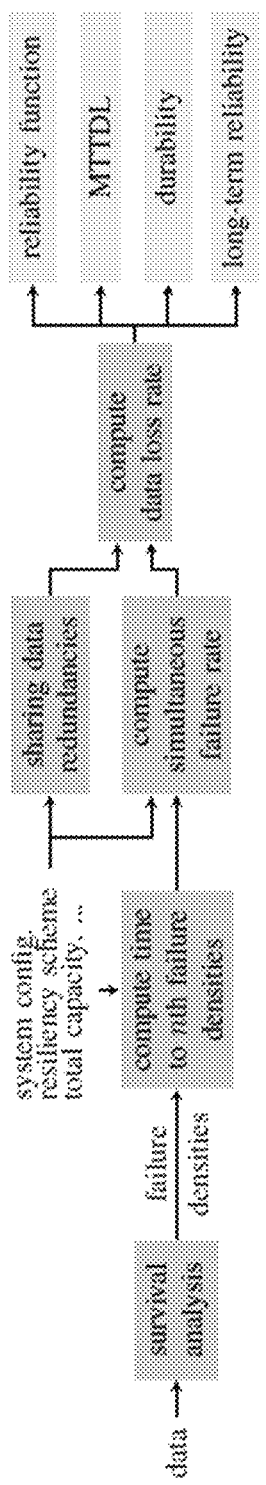
FIG. 1 is a block diagram illustrating an analytical framework for computing reliability metrics, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for accurately measuring the reliability of storage systems. Rather than relying on a series of approximations, which may produce highly optimistic estimates, the techniques described herein use a failure distribution derived from a disk failure data set to derive reliability metrics such as mean time to data loss (MTTDL) and annual durability.

A new framework for modeling storage system dynamics is described herein. The framework facilitates theoretical analysis of the reliability. The model described herein captures the complex structure of storage systems considering their configurations, dynamics, and operation. Given this model, a simulation-free analytical solution to the commonly used reliability metrics are derived. The model may also be used to analyze the long-term reliability behavior of storage systems.

In addition to the analytical framework, a parallel simulation algorithm for Monte Carlo approximation of the reliability is presented. The parallel simulation algorithm is significantly faster than the existing sequential simulation algorithms. The simulation algorithm enables computing annual durability and serves as an alternative method to verify the correctness of the analytical solution.

Also described herein is a semi-parametric approach for modeling hard drive failure distribution. The parameters may be obtained by applying survival analysis on a real data set. In the experiments, it is shown that different failure distributions result in different reliability behaviors in the storage systems. In addition, it is shown that widely-used metrics such as MTTF and AFR may be insufficient for accurate reliability estimation.

Experiments have been performed to evaluate the reliability of different storage systems. Interesting trade-offs between different parameters are discussed. Current techniques for estimating the annual probability of data loss may be inadequate in that they tend to overestimate reliability by a few orders of magnitude. The techniques herein provide more accurate metrics of reliability.

Storage System Model

Data storage systems have a complex dynamical structure consisting of a large number of devices. The first step to analyze the reliability of a storage system is to develop a descriptive yet simple model that abstracts the behavior of this complex system. Developing such a model requires understanding system architecture and dynamical behavior of individual devices.

In the reliability estimation techniques described herein, a storage system is modeled as a collection of storage nodes each holding one storage device (disk) containing chunks of data, called data volumes. A "storage node" generally refers to a placement for one storage device, and not to the entire storage server. For the purposes of the model, it is assumed that the storage devices are statistically similar, i.e. they have a similar failure distribution, read/write bandwidth, and similar recovery distribution. This assumption is reasonable in modern storage systems where data are stored and equally distributed on devices of similar type. The model makes no assumptions regarding failure and recovery distributions.

Storage devices are susceptible to failure. Device failures can be permanent—for example, due to hardware malfunction—where the data stored on the device are permanently lost. Transient failures happen when a storage device becomes temporarily unavailable due to software updates, server reboots, or maintenance. The outage of infrastructure resources such as power also causes temporary unavailability of data. Similar to previous works, it is assumed that permanent failures of storage devices are independent.

The total amount of data stored in a system includes data and their redundancies. Data redundancies are created and stored to retain data beyond the lifetime of storage devices. Different resiliency schemes are used in practice. A-way replicated systems store a number of copies of data in A independent availability domains. Other storage systems use erasure coding, another resiliency scheme where each set of l data volumes are encoded into a set of m>l volumes and stored in the system.

Data redundancies are used to restore the lost data to a new replacement device. Recovery duration is the amount of time it takes to activate and finish a data rebuild process. In general, recovery duration is a random variable and depends on several factors such as the size of data stored on the device, resiliency scheme, rebuild process, and device and network bandwidth. Even with using data redundancies, it is still possible that a series of node failures occur during the rebuild process resulting in wiping out some data along with all their redundancies. This is known as permanent or irrecoverable data loss. Reliability analysis of a storage system is concerned with computing the possibility of data loss given system configuration and maintenance policies.

Reliability Metrics

Techniques for computing various reliability metrics are described herein. In particular, techniques are provided for computing the reliability function of the system, mean time to data loss, a data durability metric, and the instantaneous rate of data loss.

The reliability function is a metric that characterizes the reliability of a storage system and is formally defined as one minus the cumulative density function (CDF) of time to first data loss. The time taken for a system to experience the first data loss incident is a random variable that depends on the system configuration, devices, and maintenance policies.

The mean time to data loss (MTTDL) metric reflects the average time it takes for a storage system to experience the first data loss incident. MTTDL is the most commonly used reliability metric in research papers since it is relatively simple to estimate. However, for storage systems with high reliability, MTTDL can be very large reaching a few hundreds or thousands of years.

The data durability metric reflects the probability that data is safely retained in the system over a pre-specified span of time. Annual durability is often reported by the cloud storage service providers in the number of 9's. For instance, annual durability of eleven 9's means that the probability of data loss over one year is $10^{-11}$. Data durability is sometimes computed over the system mission time—for example, 10 or 20 years.

The instantaneous data loss rate metric refers to the rate with which data loss events happen, expressed in the number of events per unit time. Integrating instantaneous data loss rate over a time interval evaluates to the expected number of data loss events in that interval.

In addition to reliability, analyzing data availability, the fraction of time data is accessible through the storage system, is of interest. While the techniques described herein are described in the context of reliability, the framework is general and can be directly extended to estimate data availability.

Analytical Computation of Reliability

According to one embodiment, the following general steps are carried out to compute the reliability metrics of a storage system:

1. The sequence of device failure events in each storage node is modeled as a random process. The probability distributions of event inter-arrival times and time to the nth event are derived.

2. The instantaneous rate of data loss at any time t is derived by computing the simultaneous failure rate of a pre-specified number of storage nodes and multiplying this rate by the probability that a simultaneous failure results in irrecoverable data loss.

3. Different reliability metrics such as durability, the reliability function, and MTTDL are derived given the instantaneous rate of data loss.

4. Long-term reliability behavior of storage systems are derived in closed-form solutions.

Referring to FIG. 1, it is a block diagram illustrating an analytical framework for computing reliability metrics, according to an embodiment. As illustrated in FIG. 1, the framework first computes the failure densities from hard drive failure data. Based on the failure densities and the system configuration, the instantaneous data loss rate is computed. Other reliability metrics are then computed from the data loss rate.

In FIG. 1, for simplicity, the derivation of reliability metrics is restricted by only considering the storage device (disk) failures. However, the analysis can be extended to take into account a hierarchical architecture and the failure of other devices such as servers.

Stochastic Modeling of Node Failure Events

Figure 2:
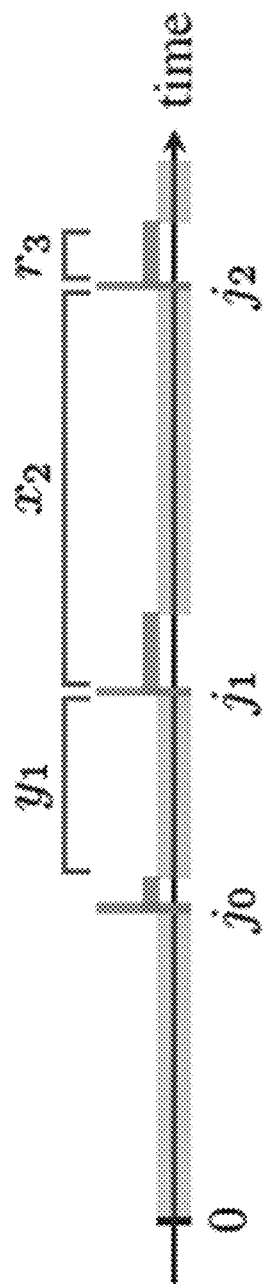
FIG. 2 is a timeline that illustrates an example of the stream of failure events in one node.

For the purpose of modeling failure events, a single node in a storage system is considered to be a placement for holding a storage device containing a set of data volumes. A node experiences a failure event when its storage device permanently fails. In this case, the storage device is replaced with a new device and data are restored to the new device from the available redundancies. A node may experience multiple failure events over a span of time. FIG. 2 is a timeline that illustrates an example of the stream of failure events in one node at times $J_i$ for $i \geq 0$. The inter-arrival times between failure events are denoted by $X_i = J_i - J_{i-1}$ for $i \geq 1$. Inter-arrival times can also be written as $X_i = R_i + Y_i$, where $R_i$ is the ith recovery time and $Y_i$ is the ith time to failure. The collection of failure events $\{J_i\}_{i \neq 0}$ for each storage node forms a random process. Random variables $X_i$ represent event inter-arrival times. Under these modeling assumptions, the sequence of failure events in one node is shown to form a renewal process. The definition of a renewal process is presented below:

Definition 1. (Renewal Process) Consider a random sequence of events at jump times $\{J_i\}_{i \geq 0}$ with inter-arrival times defined as $X_i = J_i - J_{i-1}$ for $i \geq 1$. This sequence of events is called a renewal process, if and only if $X_i$ are independent and identically distributed (i.i.d.).

Let D denote the random variable representing time to failure of a device with a failure density $f_D(d)$. Furthermore, let R denote the random variable representing the data recovery duration with density $f_R(r)$. As used herein, capital letters denote random variables and small letters are used to represent their realizations. For example, $f_x(X=x)$ (or $f_x(x)$ for short) is the probability density function (pdf) of random variable X when it has the value x. Recall the following theorem on the sum of independent random variables Theorem 1 (Sum of Independent Random Variables) Let X and Y be two independent random variables with probability density functions $f_x(x)$ and $f_y(y)$ taking values in a measurable space X. Then the sum $Z = X + Y$ is a random variable with the density function $f_z(z) = (f_x * f_y)(z)$, where * denotes the convolution operator.

It is argued below that event inter-arrival times $\{X_i\}_{i \geq 1}$ are i.i.d. whether device retirement is used or not. If storage devices are not replaced after a certain age, time to failure $Y_i$ is equal to time to failure of the ith storage device denoted by $D_i$. As stated before, storage devices are assumed to have a similar failure distribution $f_D(d)$ and fail independently. The recovery times $R_i$ are also i.i.d. with distribution $f_R(r)$ and are independent of $Y_i$. Hence, the inter-arrival times $X_i = R_i + D_i$ are i.i.d. and the density function inter-arrival times is equal to $(f_D * f_R)(x)$ as a direct result of Theorem 1.

In the case where devices are retired after operating for a duration $r_e$, the following proposition shows that the sequence of failure events form a renewal process.

Proposition 1. (Failure Inter-arrivals under Retirement) Given time to failure density $f_D(d)$, recovery density $f_R(r)$, and retirement age $r_e$, the sequence of failure events of a storage node form a renewal process with the inter-arrival density of $$f_X(x) = \left[(1 - F_D(r_e))^{\left\lfloor \frac{x}{r_e} \right\rfloor} f_D(\hat{x})\right] * f_R(x), \quad (1)$$

where $$\hat{x} = x - \left\lfloor \frac{x}{r_e} \right\rfloor r_e$$

and $F_D$ is the failure CDF.

Proof. The retirement policy is the same for all devices and performed independently. Therefore, the inter-arrival times between failure events remain i.i.d. and the sequence of failure events construct a renewal process. When $Y_i < r_e$, i.e. device fails before retirement, time to failure has density $f_D(d)$. When $Y_i \in [k, (k+1)r_e)$ for any $k \geq 1$, exactly k storage devices are safely retired and the (k+1)th device fails before retirement causing the ith failure event. The probability that a device lasts for at least $r_e$ and can be retired is $1 - F_D(r_e)$. Therefore, probability density of $Y_i$ for every i is computed by $f_Y(y) = (1 - F_D(r_e))^k f_D(y - kr_e)$ for $kr_e \leq y < (k+1)r_e$.

Applying Theorem 1 gives the final result.

The ith failure time (ith jump time) can be written as:

$$J_i = D_0 + \sum_{k=1}^{i} X_k \text{ for } i \geq 0$$

where by convention $\Sigma_{K=1}^{0} X_k = 0$.

Here, $D_0, X_1, \ldots X_i$ are independent random variables. From the result of Theorem 1:

$$\begin{cases} f_{J_i}(t) = (f_D * \underbrace{f_X * \ldots * f_X}_{i-1 \text{ times}})(t) & \text{for } i > 1 \\ f_{J_i}(t) = f_D(t) & \text{for } i = 1 \end{cases} \quad (2)$$

Probability densities $f_{J_i}(t)$ can be computed directly or by using the Laplace transform.

Instantaneous Data Loss Rate

Figure 3:
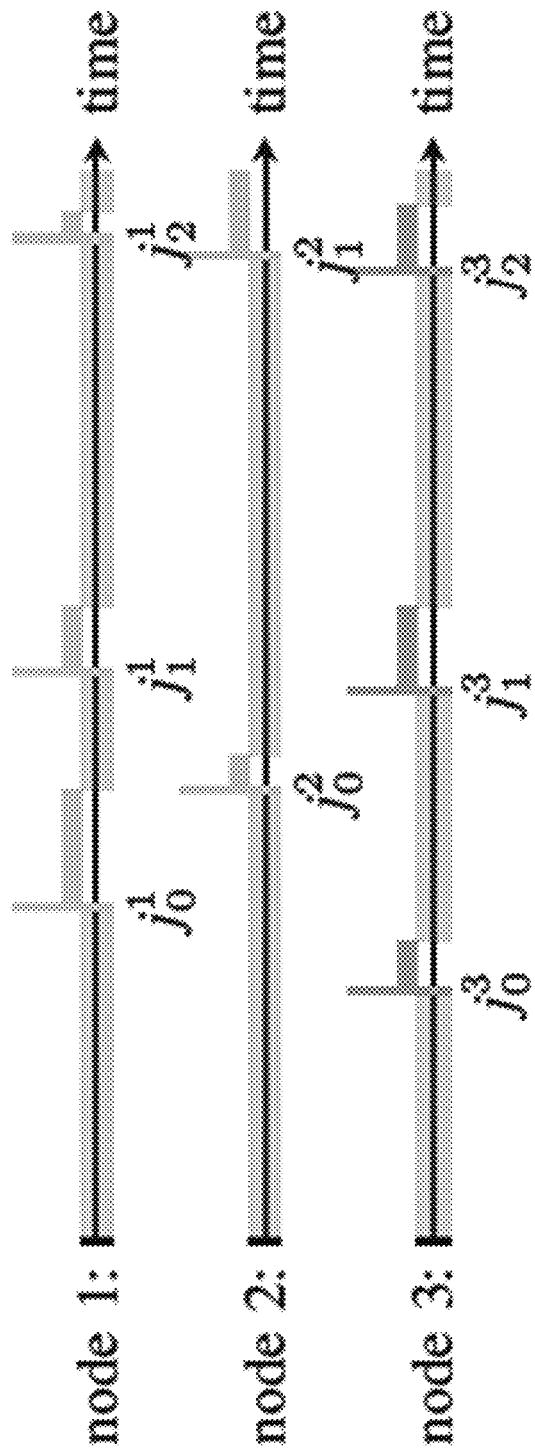
FIG. 3 illustrates an example of a data loss event in a three-way replicated system, where three replicas of a data volume are stored on three different nodes.

In a large distributed storage system, device failures happen frequently, which may result in an irrecoverable data loss. FIG. 3 illustrates an example of a data loss event at time $t = j_2^1$ in a three-way replicated system, where three replicas of a data volume v are stored on three different nodes. Each node experiences a sequence of failure events and recovery intervals. Data loss happens at time t if the node containing the last available replica fails at time t. In this case, the rest of the replicas are lost before t and their rebuild processes are not yet completed.

The instantaneous rate of data loss $\lambda_L(t)$ is computed given $f_{J_i}(t)$. Let A be the minimum number such that the loss of at least A redundancies of a data volume results in an irrecoverable data loss. For instance, in a three-way replicated system A is equal to 3. The instantaneous rate of data loss can be computed by multiplying the instantaneous rate of simultaneous failure of A nodes by the probability that all A nodes store redundancies of at least one particular data volume.

Let $i_a(t)$ be a counter variable that stores the number of failure events occurred in node a up to time t for a $\in \{1, \ldots, A\}$. For example, in FIG. 3 at time $t = j_3^1$, the counter variables are given by $i_1 = 3$, $i_2 = 2$, and $i_3 = 3$, where t is dropped for notation simplicity. Data loss at time t is caused by the $i_1$th failure node 1, $i_2$th failure of node 2, and so forth. Define $\lambda_F(t; A)$ to be the instantaneous rate of simultaneous failure of A storage nodes at time t, where A storage nodes either fail or are in recovery at time t. The rate $\lambda_F(t; A)$ can be written as a sum over all the possibilities of $i_1, \ldots, i_A$ $$\lambda_F(t; A) = \sum_{i_1, \ldots, i_A} \lambda_F(t, i_1, \ldots, i_A; A) \quad (3)$$

For an irrecoverable data loss to happen at time t, one node has to fail at time t, denoted by $l \in (1, \ldots, A)$, while all other nodes must fail sometime before t and remain in recovery until t. In other words, $$\begin{cases} J_{i_a} \leq t, & J_{i_a} + R_{i_a} > t \text{ for } a \neq l \\ J_{i_a} = t & \text{for } a = l \end{cases} \quad (4)$$

$\lambda_F(t, i_1, \ldots, i_A; A)$ can be written as $$\lambda_F(t, i_1, \ldots, i_A; A) = A f_{J_{i_l}}(t) \prod_{a \neq l} p_{i_a}(t)$$

In equation 4, $$f_{J_{i_l}}(t)$$

is the probability density that node 1 fails at time t and $p_{i_a}(t)$ is the probability that node a is still in recovery at time t. Coefficient A corrects for the fact that any of the A storage nodes can be the last one to fail. In the equation:

$$p_{i_a}(t) = \int_{r_a} f_R(r_a) f_{J_{i_l}}(t - r_a < J_{i_a} \leq t | r_a) dr_a$$

$$f_R(r_a) f_{J_{i_l}}(t - r_a < J_{i_a} \leq t | r_a)$$

is the probability density that the recovery duration of storage node a is $r_a$ times the probability that the node fails sometime between $t - r_a$ and t. This implies that node a is not recovered prior to t. This probability density is then integrated over all possible values of $r_a$, resulting in $$\lambda_F(t; A) = \sum_{i_1,\ldots,i_A} \left[ f_{J_{i_l}}(t) \prod_{a \neq l} p_{i_a}(t) \right] \quad (5)$$

$\lambda_L(t)$ can be computed from the rate of simultaneous failures $$\lambda_L(t) = \sum_{n_1,\ldots,n_A} \lambda(\text{data loss at } t \text{ by failure of } n_1, \ldots, n_A) \quad (6)$$

$$= \sum_{n_1,\ldots,n_A} \lambda_F(t; A) p\left( \bigcap_{a=1}^{A} n_a \neq \emptyset \right).$$

Here, $p(\bigcap_{a=1}^{A} n_a \neq \emptyset)$ denotes the probability that nodes $n_1, \ldots, n_A$ all contain redundancies of at least one data volume. In the following section, this probability is computed for a few common resiliency schemes.

Probability of Sharing Redundancies

A-Way Deterministic Replicated Systems: In an A-way deterministic replicated system, the position of data volumes are exactly copied in A availability domains. In other words, if two data volumes are neighbors in one availability domain, i.e. they are on one storage node, then their replicas are also neighbors in all other availability domains. Let N be the total number of storage nodes in each availability domain. There are exactly N/A sets of nodes whose simultaneous failure results in an irrecoverable data loss. Therefore, $$\lambda_L(t) = \frac{N}{A} \lambda_F(t; A).$$

In the above equation, since $\lambda_F(t; A)$ is independent of N, the instantaneous rate of data loss increases linearly with the number of storage nodes.

Figure 4:
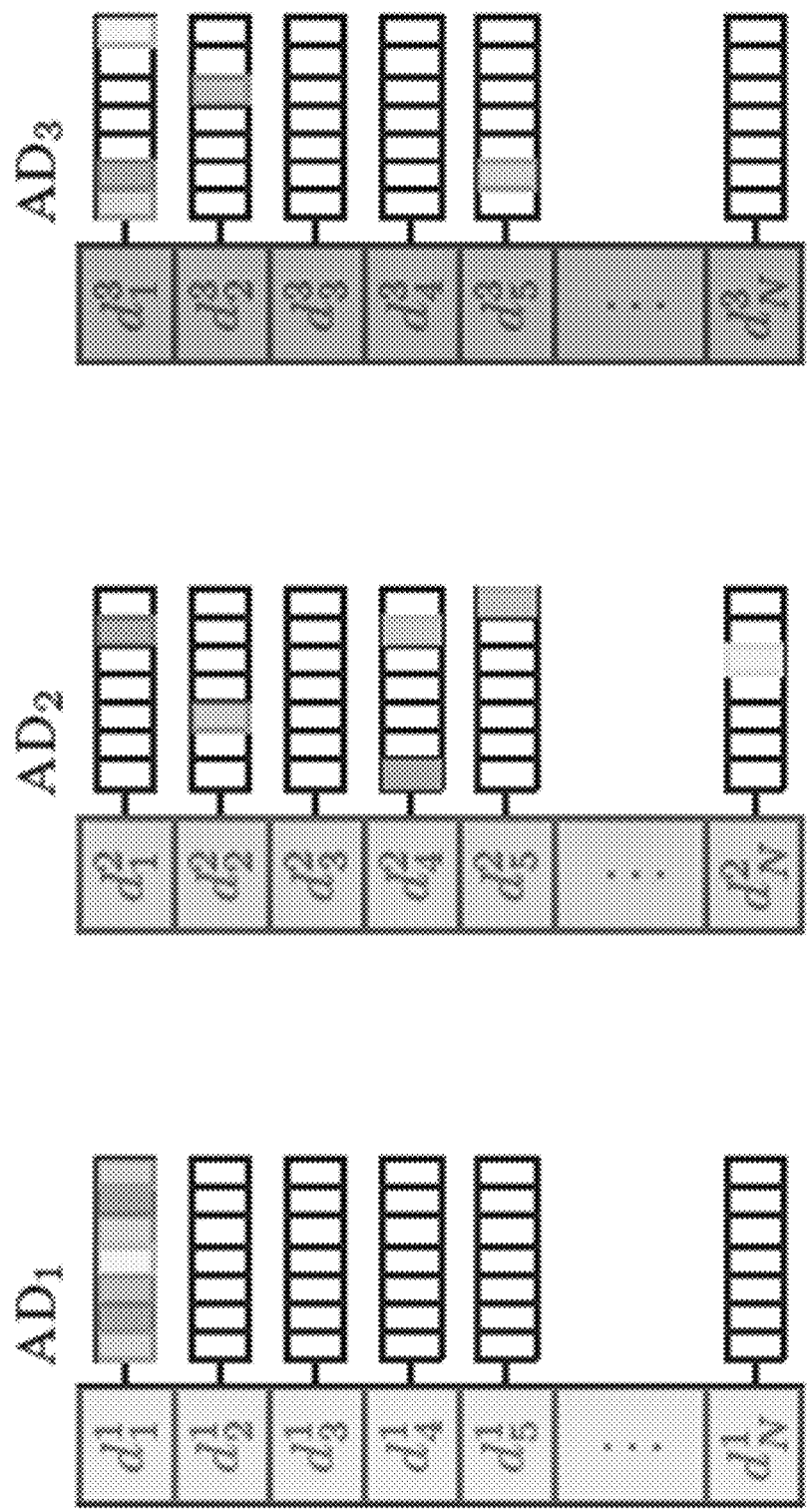
FIG. 4 illustrates a replica placement strategy of scattering data volumes among the storage nodes in each availability domain.

A-Way Randomly Shuffled Replicated Systems: Another replica placement strategy is to scatter data volumes among the storage nodes in each availability domain. An example of a three-way replicated system is illustrated in FIG. 4 where data volumes are randomly shuffled in each availability domain. The probability that any A nodes selected from distinct availability domains share data redundancies is a constant number due to the structural symmetry. The following proposition computes this probability.

Proposition 2. (Probability of Sharing Data in an A-way Randomly Shuffled System) Consider an A-way randomly shuffled replicated system with N storage nodes per availability domain and V volumes per storage node. The probability $p_s$ that any A storage nodes selected from distinct availability domains share replicas at least one volume is given by $$p_s = \sum_{k=1}^{V} (-1)^{k-1} \frac{\binom{V}{k}^A}{\binom{NV}{k}^{A-1}} \quad (7)$$

If N is large and V<<N, then $p_s$ can be approximated by $$p_s \approx \frac{V}{N^{A-1}}$$

Proof Denote by $n_a$ the selected storage node from availability domain $a \in \{1, \ldots, A\}$. Each $n_a$ is a set of V data volumes. Let $n_1 = \{v_1, \ldots, v_V\}$ be the set of data volumes on node $n_1$ and $\mathcal{I}$ be the intersection of nodes $n_2, \ldots, n_A$. The probability that $n_1, \ldots, n_A$ have a non-empty intersection is the probability that at least one of the volumes $v_1, \ldots, v_V$ be in the set $\mathcal{I}$. Denote by $E_i$ the event that $v_k \in \mathcal{I}$. The probability $p_s$ can be computed using the inclusion-exclusion principle $$p_s = \bigcup_{k=1}^{V} E_k = \quad (12)$$

$$\sum_{k_1} p(E_{k_1}) - \sum_{k_1 < k_2} p\left( \bigcap_{i=1}^{2} E_{k_i} \right) + \ldots + (-1)^{V-1} \sum_{k_1 < \ldots < k_V} p\left( \bigcap_{i=1}^{V} E_{k_i} \right).$$

The probability $$p\left( \bigcap_{i=1}^{l} E_{k_i} \right) = p(\{v_{k_1}, \ldots, v_{k_l}\} \subset \chi)$$

is computed by dividing the number of possibilities that the nodes $n_2, \ldots, n_A$ contain volumes $\{v_{k_1}, \ldots, v_{k_l}\}$ divided by all possibilities.

$$p\left( \bigcap_{i=1}^{l} E_{k_i} \right) = \frac{\binom{NV-l}{V-l}^{A-1}}{\binom{NV}{V}^{A-1}}$$

$p_s$ is further simplified to $$p_s = \sum_{l=1}^{V} (-1)^{l-1} \binom{V}{l} \frac{\binom{NV-l}{V-l}^{A-1}}{\binom{NV}{V}^{A-1}}$$

Furthermore, $$p_s = \sum_{l=1}^{V} (-1)^{l-1} \binom{V}{l} \left[ \frac{(NV-l)!(NV-V)!V!}{(V-l)!(NV-V)!(NV)!} \right]^{A-1}$$

$$= \sum_{l=1}^{V} (-1)^{l-1} \binom{V}{l} \left[ \frac{(NV-l)!l!V!}{(V-l)!l!(NV)!} \right]^{A-1}$$

$$= \sum_{l=1}^{V} (-1)^{l-1} \frac{\binom{V}{l}^A}{\binom{NV}{l}^{A-1}}$$

Provided that $V \ll N$, the first term in the summation in the Equation (7) is shown to be dominant. Since $V \geq 1$, it is concluded that $NV \gg 1$ and Stirling's approximation can be applied to the absolute value of each term of the summation in Equation (7):

$$a_l = \frac{1}{l!}\left(\frac{V!}{(V-l)!}\right)^A \left(\frac{(NV-l)!}{(NV)!}\right)^{A-1}$$

$$\approx \frac{1}{l!}\left(\frac{V!}{(V-l)!}\right)^A \left[\frac{1}{(NV)^l}\right]^{A-1}$$

The assumption $V \ll N$ gives $$\frac{(V-l)^A}{(NV)^{A-1}} < \frac{V^A}{(NV)^{A-1}} = \frac{V}{N} \ll 1$$

Using the above result, term $l+1$ in the summation is much smaller than term $l$ $$a_l = \frac{1}{l!}\left(\frac{V!}{(V-l)!}\right)^A \left(\frac{1}{(NV)^l}\right)^{A-1}$$

$$\gg \left(\frac{(V-l)^A}{(l+1)(NV)^{A-1}}\right)\left[\frac{1}{(l)!}\left(\frac{V!}{(V-l)!}\right)^A \left[\frac{1}{(NV)^l}\right]^{A-1}\right]$$

$$= \frac{1}{(l+1)!}\left(\frac{V!}{(V-l-1)!}\right)^A \left[\frac{1}{(NV)(l+1)}\right]^{A-1} = \alpha_{l+1}$$

Thus, the first term provides a good approximation of the value of $p_s$ $$p_s \approx a_1 = \frac{V^A}{(NV)^{A-1}} = \frac{V}{N^{A-1}}$$

Combining Equation (6) with the result of the above proposition yields $$\lambda_L(t) = N^A \lambda_F(t;A) p_s \approx \frac{VN^A}{N^{A-1}} \lambda_F(t;A) = NV\lambda_F(t;A), \quad (8)$$

where $N^A$ is the number of possibilities that A storage nodes are selected from distinct availability domains. In Equation (8), the instantaneous rate of data loss is linearly proportional to the total number of storage nodes and the number of data volumes. In general, using a smaller number of volumes (or equivalently, a larger volume size) reduces data loss rate. However, there are advantages in using data volumes with smaller sizes. The recovery duration is often shorter for data volumes with smaller sizes, resulting in a reduction in data loss rate. Furthermore, if a data loss incident occurs, a smaller amount of data will be lost.

Erasure Coded Systems: In an RS(m,k) erasure coded system, each data block is divided into k partitions and is encoded into a larger number of partitions m>k. Optimal erasure codes can recover the whole data block from any k available partitions. Therefore, the minimum number of node failures that can result in an irrecoverable data loss is $A=m-k+1$. In these systems, partitions of each data block are placed on distinct storage nodes. The following proposition computes the probability that any set of A nodes in an RS(m,k) erasure coded system contains partitions of at least one data block.

Proposition 3. (Probability of Sharing data in Erasure Coded systems) Consider an RS(m,k) erasure coded system with a total of N storage nodes and V data partition per storage nodes. The probability that any $A=m-k+1$ nodes contain partitions of at least one data block is given by $$p_s = 1 - \left(1 - \frac{\binom{m-1}{A-1}}{\binom{N-1}{A-1}}\right)^V$$

Proof Denote the storage nodes by $n_1, \ldots, n_A$ where each $n_a$ is a set of V data partitions. Let $n_1 = \{v_1^{i_1}, \ldots, v_v^{i_v}\}$ be the set of data volumes on node $n_1$ each coming from data blocks $i_1, \ldots, i_v$, respectively. Consider computing the complement probability $1 - p_s$. The probability that nodes $n_2, \ldots, n_A$ all store one partition of data block $i_j$ is given by $$p(n_2, \ldots, n_A \text{ contain a partition of } i_j) = \frac{\binom{m-1}{A-1}}{\binom{N-1}{A-1}}$$

Here, the numerator is computed by choosing A−1 nodes from the remaining m−1 nodes that contain a partition of block $i_j$. The denominator is computed by choosing any A−1 nodes from all the remaining N−1 nodes. The probability that nodes $n_{2:A} = \{n_2, \ldots, n_A\}$ do not store one partition of at least one data block is $$p(n_{2:A} \text{ do not contain partitions of a block}) = \left(1 - \frac{\binom{m-1}{A-1}}{\binom{N-1}{A-1}}\right)^V$$

The statement of the proposition follows from computing the complement of this probability.

If $$V\frac{\binom{m-1}{A-1}}{\binom{N-1}{A-1}} \ll 1,$$

the result of proposition 3 can be approximated by $$p_s \approx V\frac{\binom{m-1}{A-1}}{\binom{N-1}{A-1}}$$

This condition is often satisfied in large-scale storage systems. For example, if $V, m \ll N$, then $$\frac{V\binom{m-1}{A-1}}{\binom{N-1}{A-1}} \approx V\frac{(m-1)!}{(m-A)!}\frac{1}{N^{A-1}} \ll 1$$

Applying the result of Proposition 3 in Equation (6) gives:

$$\lambda_L(t) = \binom{N}{A}p_s\lambda_F(t;A) \approx \binom{N}{A}V\frac{\binom{m-1}{A-1}}{\binom{N-1}{A-1}}\lambda_F(t;A) \qquad (9)$$

$$= \frac{NV}{A}\binom{m-1}{A-1}\lambda_F(t;A)$$

As before, the rate of data loss in erasure coded systems grows linearly with the total number of nodes. Note that A-way replicated is the special case of erasure coded system with RS(m=A, k=1). Substituting these values in Equation (9) gives the same formula as in the formula derived for A-way replicated system in the previous section.

Reliability Assessment

Different reliability metrics are evaluated hereafter, each of which is derived based on the instantaneous rate of data loss. The following theorem derives storage system reliability function given $\lambda_L(t)$.

Theorem 2. (Storage System Reliability Function) Let Z be a random variable denoting time to first data loss. Provided that N>>1, the reliability function of a storage system for t≥0 can be approximated by:

$$R_Z(t) \approx \exp\left(-\int_0^t \lambda_L(\tau)d\tau\right)$$

Proof. The hazard rate based on the reliability function $R_z(t)$ is defined as $$h_Z(t) = -\frac{R'_Z(t)}{R_Z(t)}$$

In a storage system, hazard rate $h_z(t)$ is the data loss rate at time t if no data loss has occurred before t. The previously derived $\lambda_L(t)$ is the unconditional data loss rate at time t. The following lemma states that for a large-scale storage system the hazard rate is approximately equal to the data loss rate.

Lemma 1. In a storage system with N>>1 nodes, the hazard function can be approximated by the data loss rate $\lambda_L(t)$.

Proof We show that the rate of data loss at time t conditioned on a data loss event at time $t_p$<t can be approximated by the unconditional data loss rate. Since failures of storage devices are independent, a data loss event at time t can only depend on the previous data loss events where the failure of at least one device is shared. Note that failures of the storage devices must be shared not the storage nodes.

Let A'≥1 be the number of storage devices that are shared between the data loss incident at time t and a previous data loss incident at time $t_p$. The failure times of A' storage devices are denoted by $t_1, \ldots, t_{A'} \geq t_p$. The conditional data loss rate can be computed using $$\lambda_L(t|t_1,\ldots,t_{A'}) = \sum_{A'=1}^{A}\left[\binom{A}{A'}\binom{N}{A'}p_s\prod_{i=1}^{A'}\frac{\lambda_{R(r_i>t-t_i)}}{\lambda_{R(r_i>t_p-t_i)}}\lambda\_F(t,A-A')\right].$$

Conditional rate $\lambda_L(t|t_1,\ldots,t_{A'})$ shows a short-time memory that depends on the recovery distribution. For instance, if $t-t_p$ is greater than the maximum recovery duration $\lambda_{R(r_i^{>t-t_i})}$ to becomes zero resulting in $\lambda_L(t|t_1,\ldots,t_{A'})=0$. For different storage system architectures, we showed that $p_s$ is proportional to $1/N^{A-1}$ for large N. Therefore, $\lambda_L(t|t_1,\ldots,t_{A'})$ is proportional to $1/N^{A-A'-1}$ where A-A'-1≥0. Previously, it was proven that the data loss rate $\lambda_L(t)$ grows linearly with N. Therefore for any A', $\lambda_L(t)>>\lambda_L(t|t_1,\ldots,t_{A'})$.

On the account of the lemma above, the following differential equation is written to compute $R_z(t)$:

$$\lambda_L(t) \approx -\frac{R'_Z(t)}{R_Z(t)}$$

where $R_z(0)=1$ since $R_z(t)$ is one minus CDF over the interval $t \in [0,\infty)$. The statement of the theorem follows directly by solving this differential equation.

Data durability over any interval can be computed directly from Theorem 2. Furthermore, mean-time to (first) data loss can be computed by:

$$MTTDL = \int_0^\infty R_Z(t)dt = \int_0^\infty \exp\left(-\int_0^t \lambda_L(\tau)d\tau\right)dt$$

A corollary of Theorem 2 is presented below.
A corollary of Theorem 2 is presented below.
Corollary 1. The probability density function of time to first data loss $f_z(t)$ is approximated by a nonhomogeneous exponential distribution with the rate $\lambda_L(t)$.

$$f_Z(t) \approx \lambda_L(t)\exp\left(-\int_0^t \lambda_L(\tau)d\tau\right) \qquad (10)$$

Long-Term Reliability of a Storage System

The reliability of a storage system after a few years of operation is investigated in this section. In particular, it is shown that the reliability behavior of storage systems tend to stabilize provided that the system configuration remains unchanged. The following theorem states that the rate of simultaneous failure converges to a constant number.

Theorem 3. (Simultaneous Failure Rate Convergence) In the limit t→∞, $\lambda_F(t;A)$ converges to:

$$\lim_{t\to\infty}\lambda_F(t;A) = A\frac{\rho^{A-1}}{(\mu+\rho)^A}$$

where $\mu = \mathbb{E}[D]$ is the storage device mean time to failure (MTTF) and $\rho = \mathbb{E}[R]$ is the average recovery duration.

Proof. Recall the elementary renewal theorem

Theorem 4. (The Elementary Renewal Theorem) Let N(t) be the expected value of the number of events observed up to time t in a renewal process. Provided that the expected interarrival duration $\mathbb{E}[X]$ is bounded, the event arrival converges to:

$$\lim_{t \to \infty} \frac{N(t)}{t} = \frac{1}{\mathbb{E}[X]}$$

with probability one.

Given the above theorem, the failure rate of each node converges to $1/(\mu+\rho)$ since $\mathbb{E}[X] = \mathbb{E}[D+R] = \mu+\rho$. For the simultaneous failure of A nodes to occur at time t, one node must fail at t. For the remaining A−1 nodes, each node i with a (random) recovery time $r_1$ must fail sometime between $[t-r_i, t]$. Since node failure rate is constant, the probability of such an event is given by $$\lim_{t \to \infty} p(\text{node } i \text{ fails in } [t-r_i, t] \mid r_i) = \frac{r_i}{\mu+\rho}$$

The unconditional probability is given by $$\lim_{t \to \infty} p(\text{node } i \text{ fails in } [t-r_i, t]) = \int \frac{r_i}{\mu+\rho} f_R(r_i) dr_i = \frac{\rho}{\mu+\rho}$$

Thus, the simultaneous failure rate of A becomes $$\lim_{t \to \infty} f_F(t; A) = A \frac{1}{\mu+\rho} \left(\frac{\rho}{\mu+\rho}\right)^{A-1}$$

The result of Theorem 3 indicates that the storage system reliability function converges to a homogeneous exponential distribution.

Reliability Analysis of the Hierarchical Structure

Figure 5:
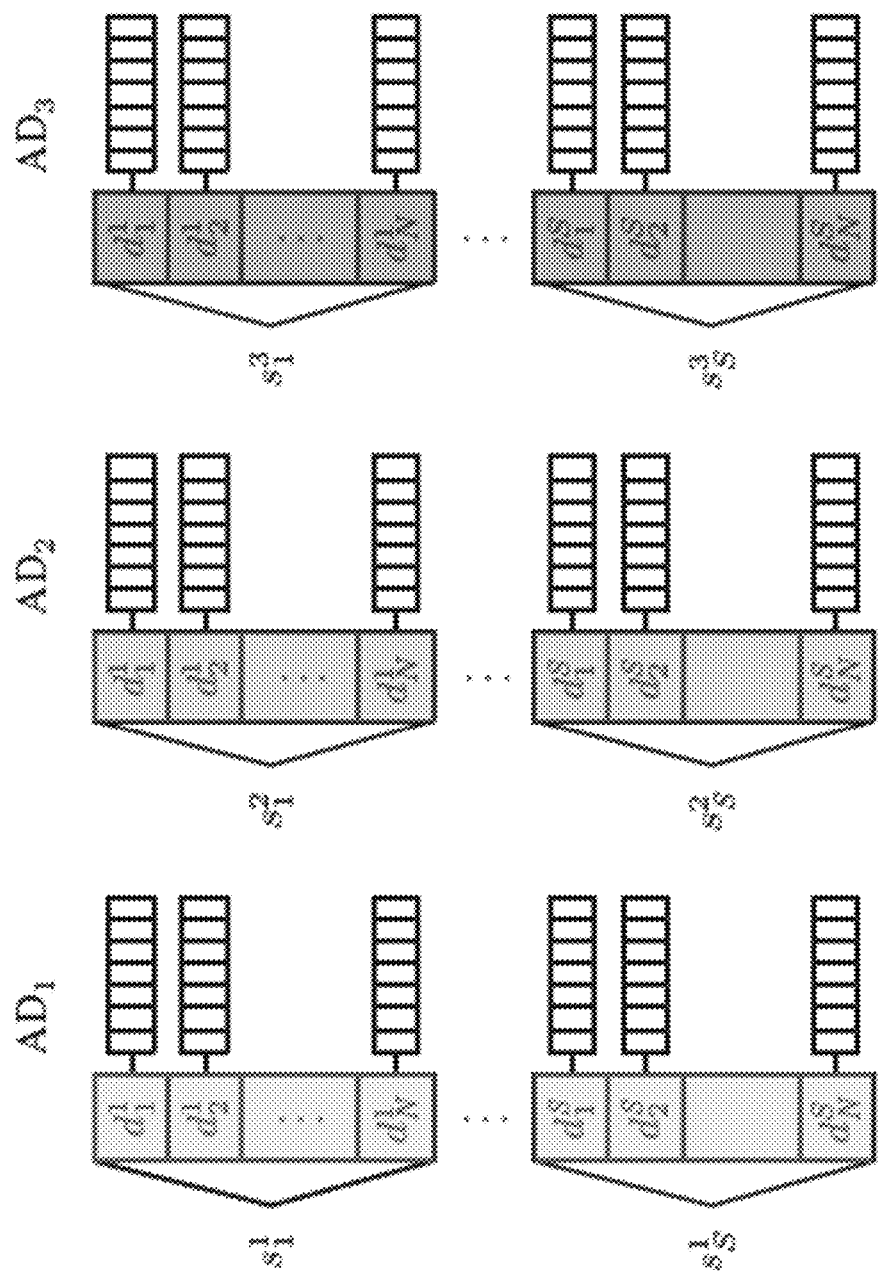
FIG. 5 illustrates a hierarchical structure in a three-way replicated storage system.

In the discussion above, the reliability metrics are derived considering only the storage device failures. This analysis can be extended to compute the reliability in a hierarchical storage system as explained in this section. FIG. 5 illustrates an example of a hierarchical structure in a three-way replicated storage system, where three independent availability domains contain copies of data. In each availability domain, there are S commodity machines (called servers) each connected to N storage nodes holding one storage device. Each storage device contains V data volumes.

In the previous sections, the instantaneous data loss rate is computed assuming that disk failures are the cause of data loss. The analysis can be extended to account for failures of other devices of a hierarchically structured storage system such as racks and servers by:

$$\lambda_L(t) = \sum_{\text{cause of data loss}} \lambda_L(t, \text{causes of data loss})$$

For instance, in the three-way replicated system presented in FIG. 5, a data loss incident can happen due to disk or server failures. Cause of data loss can be any of the following: failure of three disks, failure of two disks and one server, failure of one disk and two servers, and failure of three servers. In each case, $\lambda_L(t)$ is computed given $\lambda_F(t)$ and $p_s$ using Equation (6). $\lambda_F(t)$ can be computed by modifying the jump time, failure distribution, and recovery distribution in Equation (3) and $p_s$ can be computed based on the system structure using similar methods to the ones presented previously.

Statistical Properties of Storage Devices

Hard drive failure distribution is one of the major factors that affect storage system reliability. Survival analysis is used on an open source hard drive dataset to derive the failure distribution. This dataset contains Self-Monitoring, Analysis and Reporting Technology (SMART) features recorded for more than 100,000 hard drives over an observation period of five years. At any given day for each hard drive, the number of power-on-hours (SMART feature 9) and the failure status are recorded. The failure data is censored, i.e. hard drives may or may not fail during the observation period. It is important to properly handle censoring in the analysis and include it in the likelihood function to avoid censoring bias.

Figure 6:
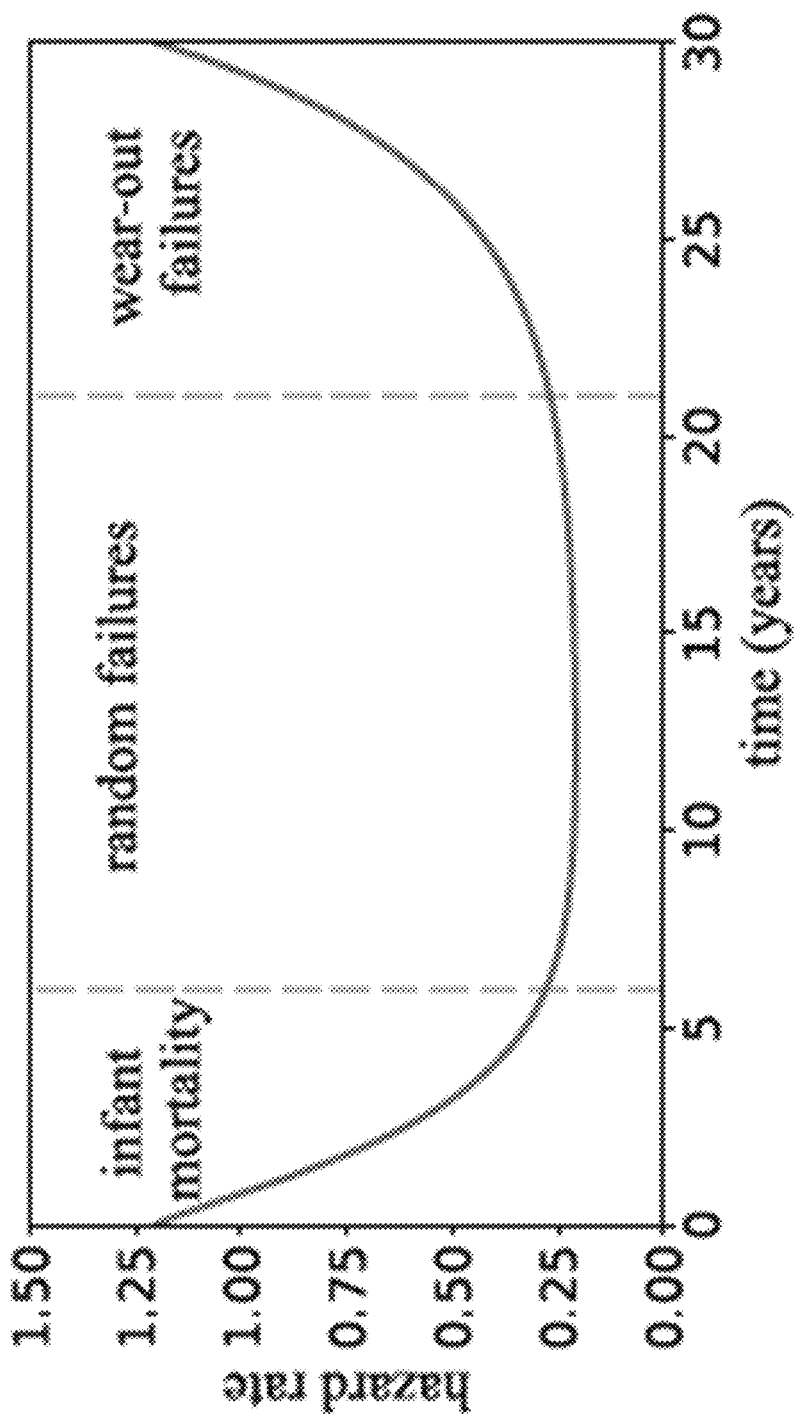
FIG. 6 illustrates a "bathtub curve", which represents the failure rate of a storage node as a function of age.

Failure distributions have been previously assumed to be exponential, resulting in a constant hazard rate. However, it is known that hazard rate changes as a function of drive age, for example according to the bathtub curve shown in FIG. 6. This particular hazard function comprises three failure modes: infant mortality where the failure rate decreases over time, random failures where the failure rate is somewhat constant and points to the useful life of a device, and wear-out failures where the failure rate increases over time.

Motivated by the bathtub curve, a Dirichlet process mixture of gamma densities is used to model the failure distribution. A mixture of densities is chosen as it captures the three modalities that are present in hard drive failures. The gamma distribution is adopted for the base density as it encompasses the exponential (memoryless) failure density as a special case. In addition, mixture of gamma densities provides a highly flexible model. For example, any continuous density $f(x)$ on $\mathbb{R}^+$ such that $$\lim_{x \to \infty} f(x) = 0$$

can be approximated arbitrarily closely by a countable weighted sum of gamma densities.

Storage System Simulation

Simulation-based approaches such as Monte Carlo methods are popular for estimating storage system reliability. In these approaches, a storage system is simulated by sampling failure and recovery times for different devices and recording the data loss incidents. The reliability metric of interest is then approximated from the results obtained from a large number of simulated experiments. Simulation-based approaches are highly flexible and can often adapt to analyze new architectures and account for more complex assumptions and system modifications.

However, there are downsides in using Monte Carlo methods. Since data loss events are scarce, simulated experiments may take a long time to observe the first data loss event, and, thereby, a large number of iterations is required to achieve statistically meaningful results. Furthermore, estimating some reliability metrics such as the probability of data loss over a short time interval is intractable using existing simulation frameworks. This is because the simulator needs a large number of iterations to get a sufficient number of samples in the interval of interest to estimate the data loss probability with high confidence.

An efficient method is proposed herein for simulating a storage system that considers general device characteristics, structure, and maintenance strategies. The simulator described herein exploits parallel generation and superposition of events for faster reliability estimation.

Existing methods use sequential sampling for storage system simulation. In sequential sampling, the simulator stores the upcoming failure event of each device in a priority queue. When a device fails, a recovery time is sampled and added to the queue. After data recovery, a new upcoming failure event is sampled and pushed to the queue. Simulation is terminated after a prespecified time or after observing the first data loss event.

In the following section, an innovative simulation method is described for an A-way replicated system such as the one illustrated in FIG. 5. This method can be modified to simulate other storage system structures.

---

Algorithm 1 Storage System Simulation

---

Input: system configuration, design parameters, maintenance schemes, failure and recovery distributions
Output: data loss events
$N_f \leftarrow$ maximum number of failure events per node
Assign IDs to each storage node
Assign IDs to each data volume
for each availability domain a do
    Sample server failure process:
    $R_a^s, J_a^s$ = GenerateEvents($f_R^s$, $f_{server}$, S, $N_f$)
    Sample disk failure process:
    $R_a^d, J_a^d$ = GenerateEvents($f_R^d$, $f_{disk}$, N, $N_f$)
    Assign disk IDs to servers
    Assign volume IDs to disks
    3D matrix $V_a[:, :, 0] \leftarrow$ merged and sorted failure events
    3D matrix $V_a[:, :, 1] \leftarrow$ corresponding recovery times
    3D matrix $V_a[:, :, 2] \leftarrow$ a (redundancy number)
    $V \leftarrow$ superimposed events from $V_a$ for $a \in \{1, \ldots, A\}$
Check for data loss considering A consecutive events
function GenerateEvents($f_R$, $f_D$, N, $N_f$)
    Sample times to failures $D \sim f_D(N, N_f)$
    Sample recovery duration $R \sim f_R(N, N_f - 1)$
    $X = D + R$     event inter-arrivals
    $J$ = cumsum(X, axis = 1)     failure event times
return R, J

---

System configuration, design parameters, dynamics, and device characteristics serve as the simulator inputs. Design parameters include total storage capacity, number of storage devices per server, number of data volumes per storage device, resiliency scheme, and time to detect device failures for recovery initiation. System dynamic parameters include capacity growth rate and device retirement age. Device survival characteristics such as failure distributions are also taken as the inputs and can be computed by applying survival analysis on a dataset.

Figure 7:
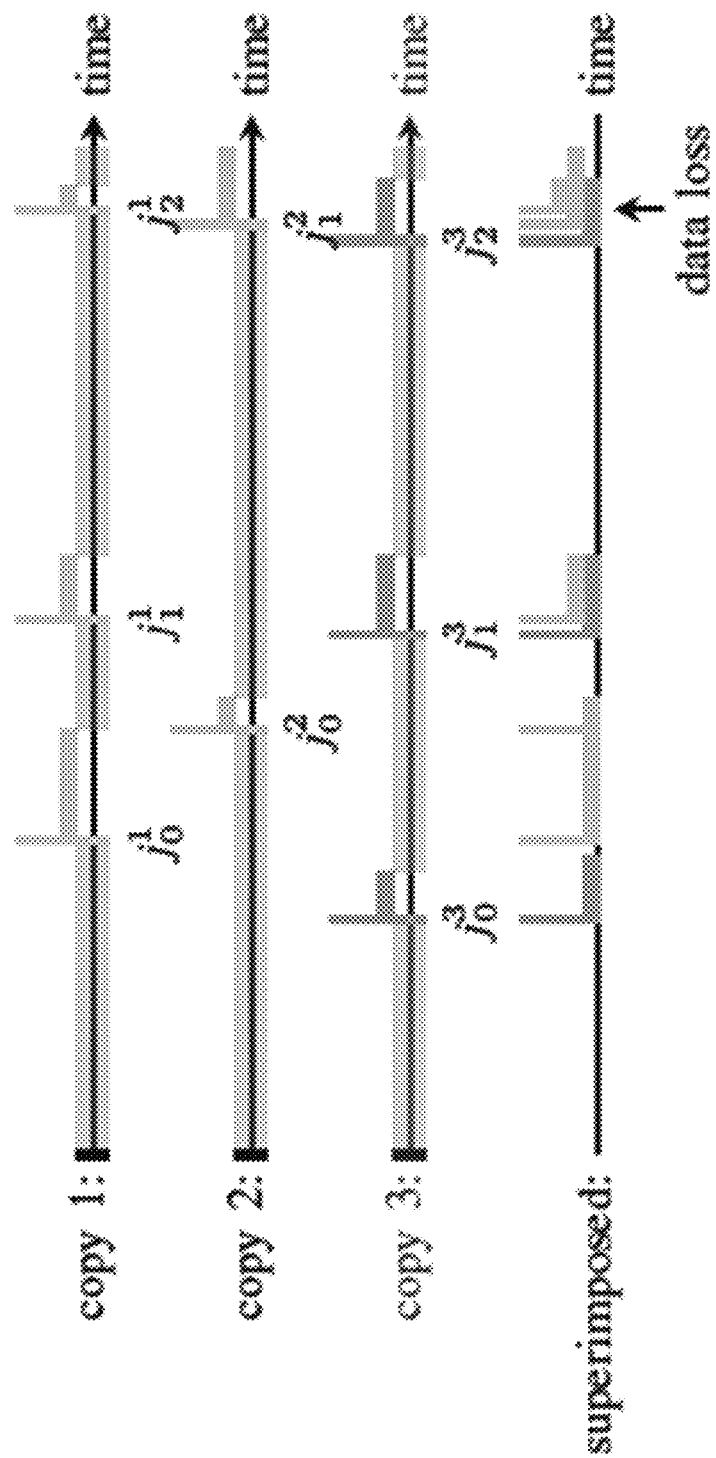
FIG. 7 illustrates an example of the algorithm's event generation module, in which the events are generated by parallel sampling and superposition of failure and recovery events.
Figure 8:
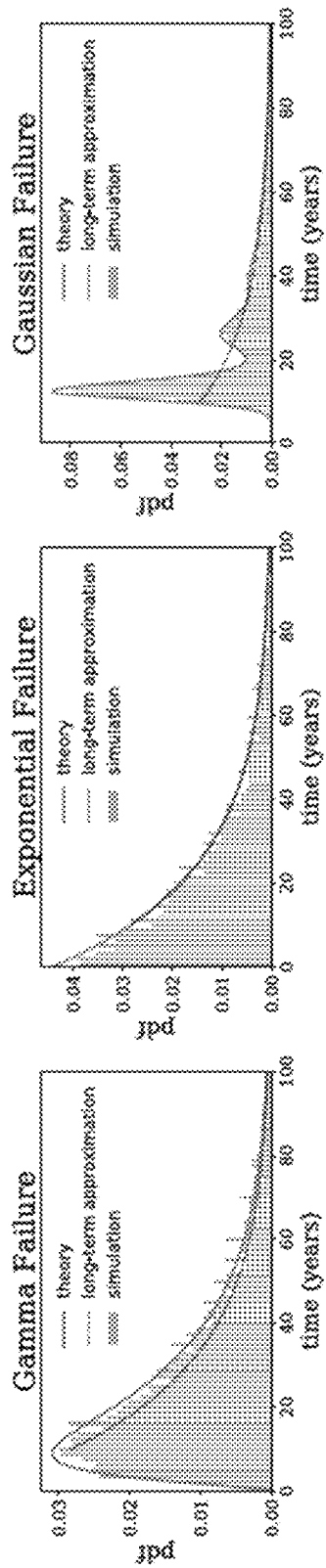
FIG. 8 illustrates the probability density function of time to data loss $f_z(t)$ for different device failure distributions; the solid lines show $f_z(t)$ computed using the analytical solution, the histograms show the sample-based approximation of $f_z(t)$ using simulation, and the dashed lines show the long-term analytical approximation of $f_z(t)$.

Referring to FIG. 7, it illustrates failure events for three replicas of a data volume and the corresponding superimposed process. Referring to FIG. 8, it illustrates the probability density function of time to data loss computed using two different approaches: (1) analytical solution (solid lines), and (2) simulation (histograms). Dashed lines show the long-term analytical approximation of $f_z(t)$ with a homogeneous exponential distribution. The analytical solutions closely match the simulation results.

Event Generation

The simulator specifies a maximum number of failure events $N_f$ for each storage node instead of maximum simulation time. For each node, $N_f$ failure times and their corresponding recovery duration are sampled from the failure distribution $f_D(d)$ and recovery distribution $f_R(r)$. All samples are drawn in parallel. The cumulative sum of the sampled failure and recovery times are computed to obtain event jump times illustrated in FIG. 7. If a hierarchical architecture is considered, failure and recovery times for other devices such as servers are also sampled in a similar way. The function GENERATEEVENTS in Algorithm 1 carries out the event generation steps.

Failure Process Assignment and Data Loss

A hierarchical structure similar to the one presented in FIG. 5 is created by assigning disks to servers and data volumes to disks. For every copy of each data volume, failure event times (caused by either a hard drive or a server failure) and their corresponding recovery duration are merged and sorted as shown in FIG. 7. In this figure, failure events of each copy are marked with a distinct line styles—such that each copy maintains a unique identification—and are then superimposed. The superimposed process is used to find data loss events. In the three-way replicated system in FIG. 7, data loss happens when the device containing the last available copy of the data fails.

Experimental Results

Experiments have been performed to verify the analytical results derived herein with simulation results. The effect of hard drive failure distribution on reliability is examined. The storage system is assumed to be a three-way replicated system with 1000 nodes per availability domain, 100 data volumes per node, and a constant recovery time of 156 hours. Three different failure distributions are considered all with the same MTTF: the gamma mixture distribution, an exponential distribution, and a Gaussian distribution with a standard deviation of 0.3×MTTF. The time to first data loss pdf $f_z(t)$ over 100 years of operation is obtained using Equation (10), and the long-term approximation of the $f_z(t)$ is computed using the result of Theorem 3. Algorithm 1 is used to obtain a sample-based approximation of $f_z(t)$. A sample size of 7,000 is used to estimate the distribution with a 99% confidence and a maximum error of 2%. The number of samples is computed using the Dvoretzky-Kiefer-Wolfowitz inequality:

$$n \geq \frac{1}{2\epsilon^2} \ln \frac{2}{\alpha}$$

where $1-\alpha$ is the confidence interval, n is the sample size, and $\epsilon$ is the maximum absolute error.

FIG. 8 presents the results of the experiments. In FIG. 8, the solid lines show $f_z(t)$ computed using the analytical solution and the histograms show the sample-based approximation of $f_z(t)$ using simulation. The experiments show that:

The results obtained from the analytical solution closely match the results obtained from simulation, which verifies the correctness of the analytical solution.

After some time, the reliability behavior in each experiment converges to a homogeneous exponential distribution as proved in Theorem 3.

Using device MTTF (or equivalently AFR) is not sufficient for characterizing reliability behavior of a storage system. Different failure distributions with similar MTTFs result in different reliability functions. As a result, computing a failure distribution from real data is a vital step in reliability analysis.

Storage System Annual Probability of Data Loss

In this section, the proposed framework is used to compute the annual probability of data loss (one minus the annual durability) for different system configurations. For the first experiment, consider a storage capacity of 10 petabytes on hard drives with 10 terabytes capacity, 100 data volumes, and a few different ρ/μ ratios. For the second experiment, a few different storage capacities are considered. Annual data loss probability is computed for different resiliency schemes that are commonly used in cloud storage system.

Figure 9:
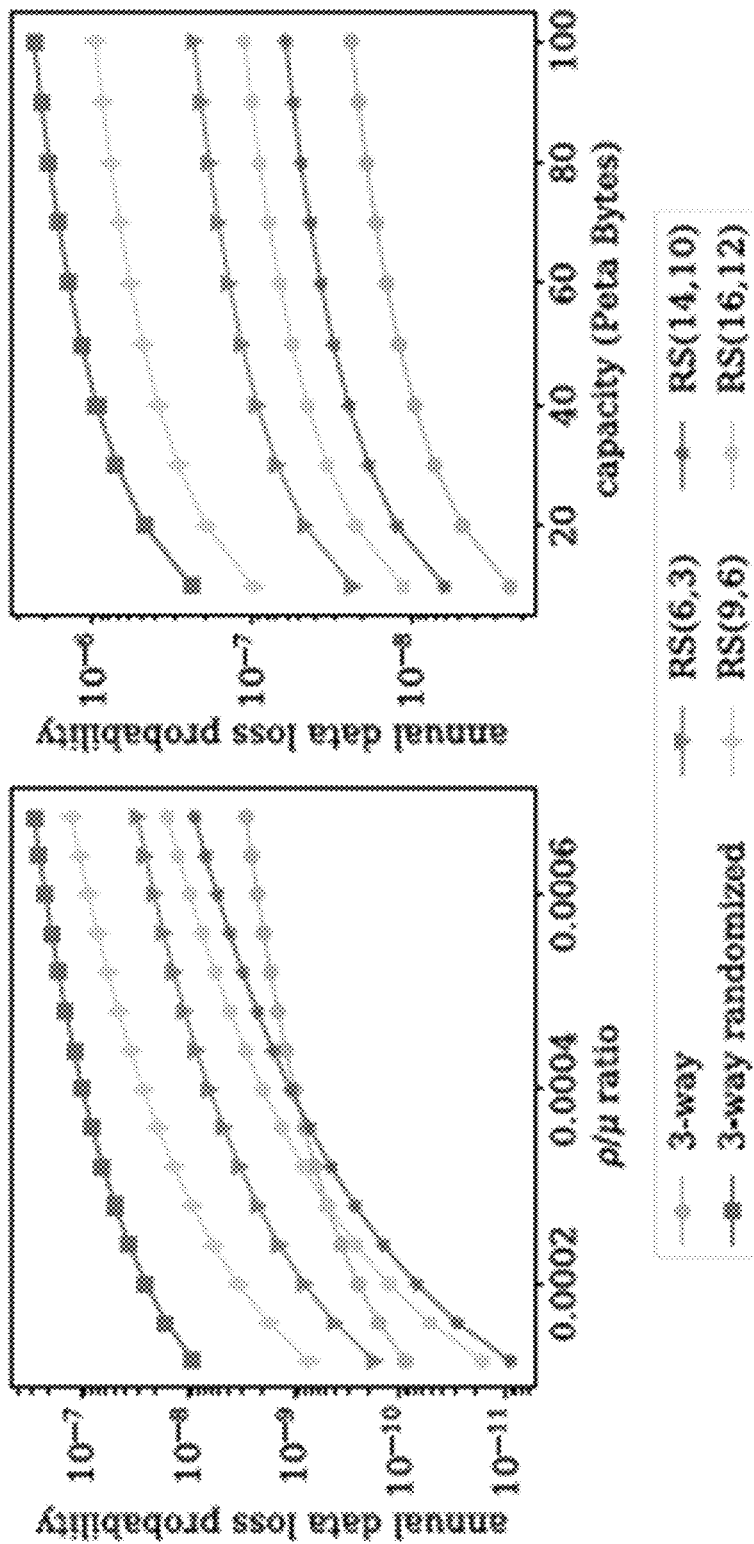
FIG. 9 illustrates the annual probability of data loss of different resiliency schemes as a function of $\rho/\mu$ (left) and the annual probability of data loss of different resiliency schemes as a function of storage capacity (right)

Referring to FIG. 9, it illustrates (on the left) the annual probability of data loss of different resiliency schemes as a function of ρ/μ, where μ is the storage device mean time to failure and p is the average recovery duration. On the right, the annual probability of data loss of different resiliency schemes is illustrated as a function of storage capacity.

The key findings of the experiments of this section are summarized below.

Existing methods highly overestimate the annual durability, which is often reported to be eleven to sixteen 9's. Considering only hard-drive failures leads to several orders of magnitude overestimation of annual reliability.

Reducing ρ/μ ratio by increasing network bandwidth, a better rebuild process, or purchasing more durable devices, increases durability.

Probability of data loss increases linearly with the total storage capacity regardless of the resiliency scheme.

The maximum number of devices allowed to fail without causing an irrecoverable data loss (a.k.a. A) is one of the most important factors that affect reliability. Erasure-coded systems RS(14, 10) and RS(16, 12) with A=5 have the highest durability.

Three-way replicated system has higher durability than the three-way randomly shuffled replicated system. However, a trade-off exists between the probability of data loss and the amount of lost data in case of a data loss incident.

Effect of Device Retirement on Reliability

Figure 10:
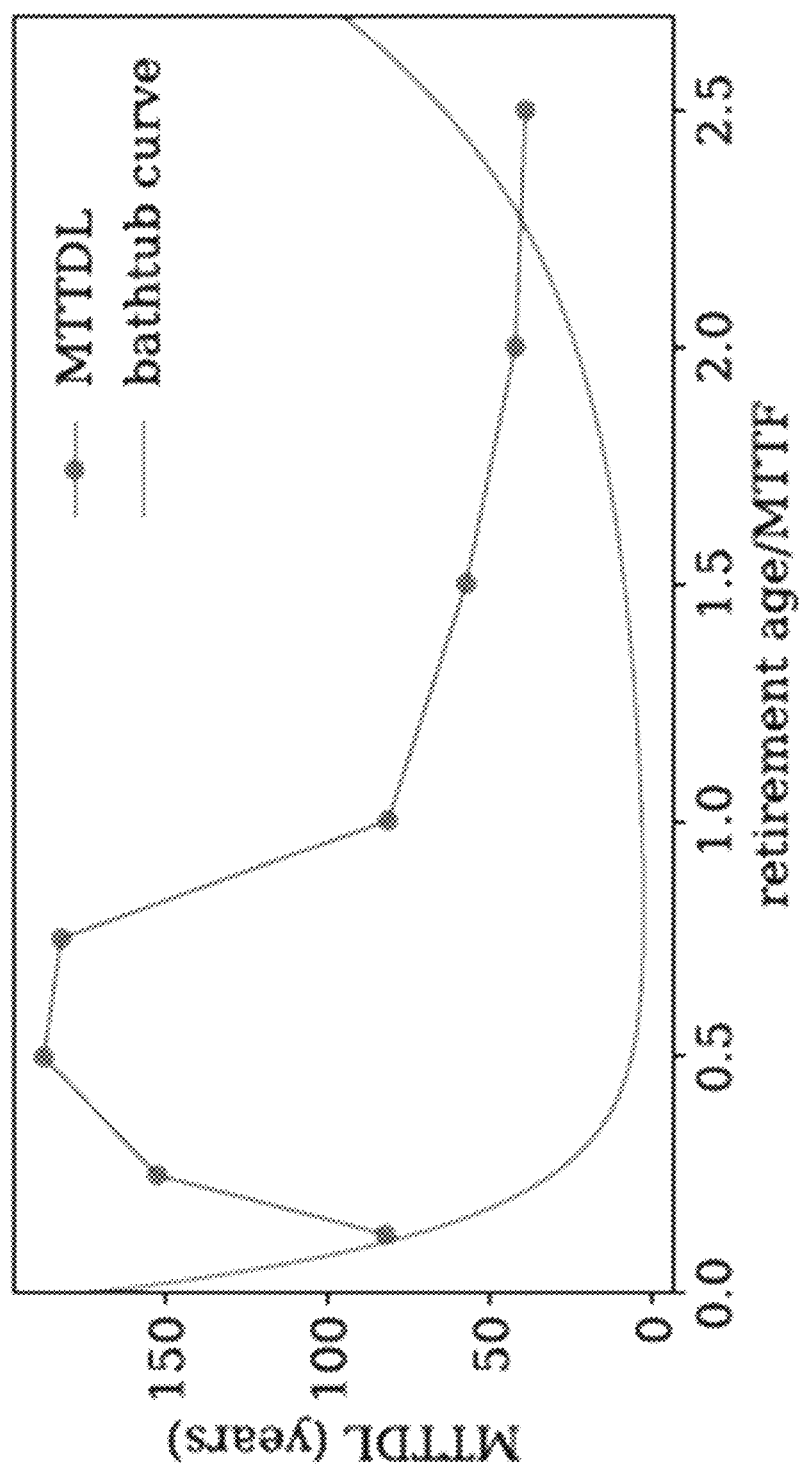
FIG. 10 illustrates mean time to data loss as a function of device retirement age.

The influence of hard drive retirement on reliability is discussed in this section. As before, the storage system is considered to be a three-way replicated system with 1000 hard drive per availability domain, 100 data volumes per drive, and recovery time of 156 hours. FIG. 10 illustrates MTTDL as a function of device retirement age. In this figure, the highest MTTDL is achieved when the device is retired before entering the wear out region in the bathtub curve. If the device is retired too early and before entering the useful-life region, the high failure rate due to infant mortality reduces MTTDL. If the device is retired too late and long after entering the wear-out region, the high failure rate due to wear and tear reduces MTTDL. Summary of the conclusions from this experiment are presented below:

If an appropriate retirement age is chosen, device retirement increases system reliability by reducing the frequency of failure events.

It is possible to obtain a retirement age that maximizes reliability. This optimal retirement age highly depends on the failure distribution.

Run-Time Comparison of Different Frameworks

Table 3 compares the efficiency of computing reliability metrics using different approaches. The reliability function is computed over a mission time of 20 years and simulation-based methods use 7,000 samples. For the analytical solution, computing the reliability function requires an average overhead of 165.4 seconds for computing the probability density of ith failure event using Equation (2). If the device failure distribution does not change, computing reliability given another different system configuration takes an average run-time of 1.143 seconds. Computing annual durability using simulation is very time-consuming. However, the analytical solution can compute an exact value for annual durability efficiently.

TABLE I

Comparing the run-time of different frameworks

| Metric | Reliability function | Annual durability |
|---|---|---|
| Sequential simulation | $8.141 \times 10^5$ s | intractable |
| Parallel simulation (ours) | $6.925 \times 10^3$ s | $1.5792 \text{ s} \times 10^3$ s |
| Analytical solution (ours) | 1.143 s + 165.4 s | 0.019 s |

Summary

A general framework for the reliability analysis of data storage systems is described herein. The approach models the storage node failure events as a random process and computes the instantaneous rate of data loss of the system. Given this rate, common reliability metrics such as data durability, the reliability function, and mean time to data loss are computed.

The analytical results were validated by comparing the results with an efficient simulation algorithm. The methodology presented herein can be extended to analyze the reliability of other systems with different and perhaps more complicated failure dependency structure and dynamics. The model can be further enriched by gathering more real-world data on the behavior of the system. A storage system is as a complex dynamical network of its devices. Understanding the reliability behavior of individual devices and their relationship can improve the analysis even further.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 11:
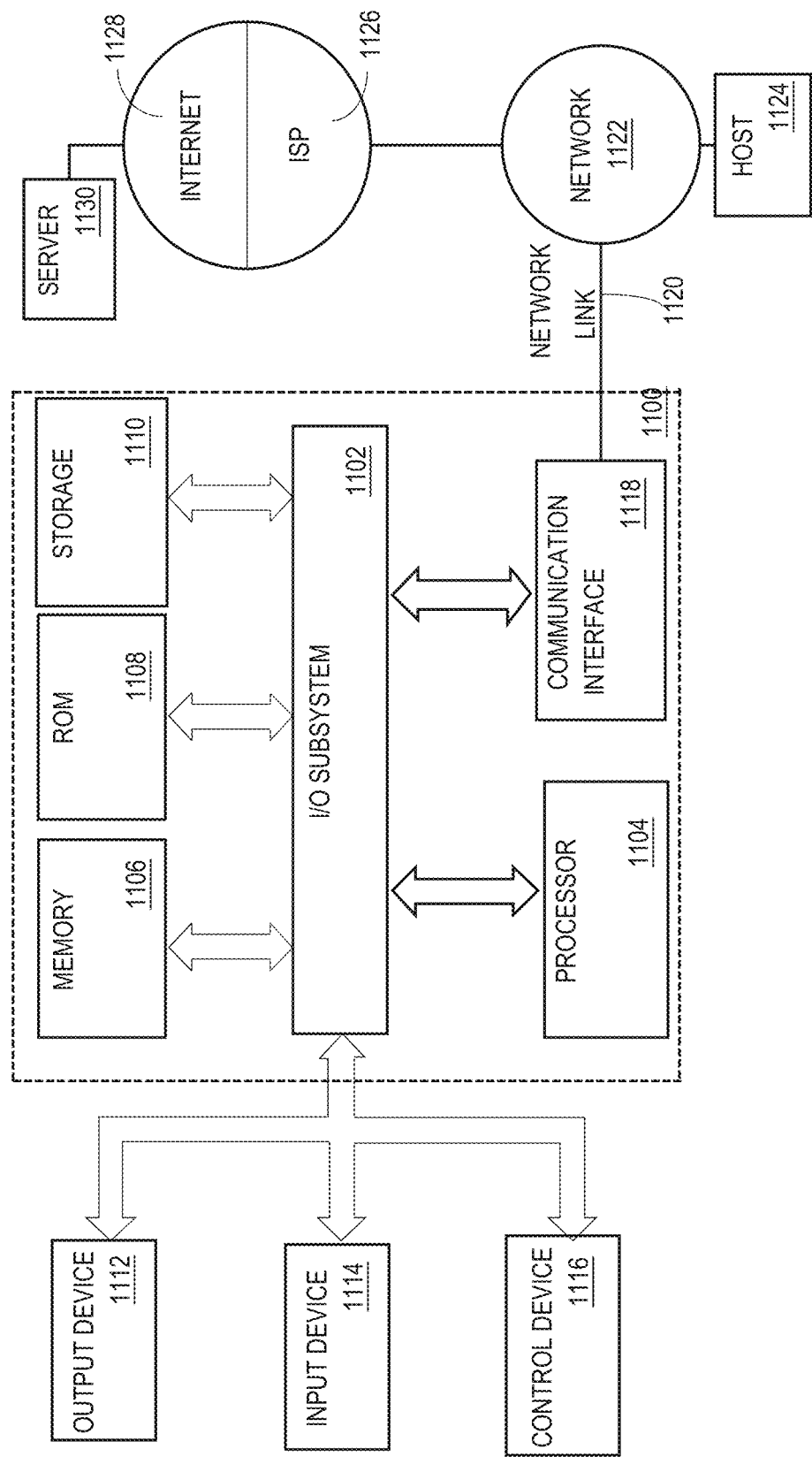
FIG. 11 is a block diagram of a computer system upon which embodiments of the invention may be implemented.

For example, FIG. 11 is a block diagram that illustrates a computer system 1100 upon which an embodiment of the invention may be implemented. Computer system 1100 includes a bus 1102 or other communication mechanism for communicating information, and a hardware processor 1104 coupled with bus 1102 for processing information. Hardware processor 1104 may be, for example, a general purpose microprocessor.

Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Such instructions, when stored in non-transitory storage media accessible to processor 1104, render computer system 1100 into a special-purpose machine that is customized to perform the operations specified in the instructions.

Computer system 1100 further includes a read only memory (ROM) 1108 or other static storage device coupled to bus 1102 for storing static information and instructions for processor 1104. A storage device 1110, such as a magnetic disk, optical disk, or solid-state drive is provided and coupled to bus 1102 for storing information and instructions.

Computer system 1100 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

Computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1110. Volatile media includes dynamic memory, such as main memory 1106. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid-state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118.

The received code may be executed by processor 1104 as it is received, and/or stored in storage device 1110, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for estimating reliability of a storage system, comprising:
   obtaining storage device failure data for the storage system, the storage system including a plurality of storage devices;
   obtaining system configuration information, wherein the system configuration information specifies a configuration of the storage system;
   based on the storage device failure data, determining failure densities;
   based on the failure densities and the system configuration information, determining an instantaneous data loss rate;
   based on the instantaneous data loss rate, determining one or more reliability metrics for the storage system; and
   retiring one or more storage devices of the plurality of storage devices from the storage system prior to failure of the one or more storage devices according to the one or more reliability metrics;
   wherein the method is performed by one or more computing devices.

2. The method of claim 1 wherein determining the instantaneous data loss rate is performed based on a formula, the formula being:

$$\sum_{n_1,\ldots,n_A} \lambda_F(t; A) p\left(\bigcap_{a=1}^{A} n_a \neq \emptyset\right)$$

where variables of the formula have meanings as set forth in the present application.

3. The method of claim 1 wherein the one or more reliability metrics includes a reliability function that represents time to first data loss within the storage system.

4. The method of claim 3 wherein the reliability function is computed according to a formula, the formula being:

$$R_Z(t) \approx \exp\left(-\int_0^t \lambda_L(\tau) d\tau\right)$$

where variables of the formula have meanings as set forth in the present application.

5. The method of claim 3 wherein the storage system is an A-way replicated system and the reliability function is computed using a formula, the formula being:

$$\lambda_L(t) = N^A \lambda_F(t; A) p_s \approx \frac{VN^A}{N^{A-1}} \lambda_F(t; A) = NV \lambda_F(t; A)$$

where variables of the formula have meanings as set forth in the present application.

6. The method of claim 3 wherein the storage system is an erasure coded system and the reliability function is computed using a formula, the formula being:

$$\frac{NV}{A}\binom{m-1}{A-1}\lambda_F(t; A)$$

where variables of the formula have meanings as set forth in the present application.

7. The method of claim 1 wherein determining an instantaneous loss rate includes determining $\lambda_F(t; A)$, an instantaneous rate of simultaneous failure of A storage notes at time t, where A storage nodes either fail or are in recovery at time t.

8. The method of claim 7 wherein $\lambda_F(t; A)$ is determined based on a formula, the formula being:

$$\lambda_F(t; A) = A \sum_{i_1,\ldots,i_A} \left[ f_{J_{i_l}}(t) \prod_{a \neq l} p_{i_a}(t) \right]$$

where variables of the formula have meanings as set forth in the present application.

9. The method of claim 1 wherein the one or more reliability metrics includes a mean time to data loss (MTTDL).

10. The method of claim 9 wherein the mean time to data loss is computed based on a formula, the formula including:

$$MTTDL = \int_0^\infty R_Z(t) dt = \int_0^\infty \exp\left(-\int_0^t \lambda_L(\tau) d\tau\right) dt$$

where variables of the formula have meanings as set forth in the present application.

11. The method of claim 1 wherein the one or more reliability metrics includes a data durability metric that indicates probability that data is safely retained in the storage system over a pre-specified span of time.

12. One or more non-transitory computer-readable media storing instructions that, when executed by one or more processors, cause:
   obtaining storage device failure data for a plurality of storage devices in a storage system;
   obtaining system configuration information, wherein the system configuration information specifies a configuration of the storage system;
   based on the storage device failure data, determining failure densities;
   based on the failure densities and the system configuration information, determining an instantaneous data loss rate;

based on the instantaneous data loss rate, determining one or more reliability metrics for the storage system; and retiring one or more storage devices of the plurality of storage devices from the storage system prior to failure of the one or more storage devices according to the one or more reliability metrics wherein the method is performed by one or more computing devices.

13. The one or more non-transitory computer-readable media of claim 12 wherein determining the instantaneous data loss rate is performed based on a formula, the formula including:

$$\sum_{n_1,\ldots,n_A} \lambda_F(t; A) p \left( \bigcap_{a=1}^{A} n_a \neq \emptyset \right)$$

where variables of the formula have meanings as set forth in the present application.

14. The one or more non-transitory computer-readable media of claim 12 wherein the one or more reliability metrics includes a reliability function that represents time to first data loss within the storage system.

15. The one or more non-transitory computer-readable media of claim 14 wherein the reliability function is computed according to the a formula, the formula being:

$$R_Z(t) \approx \exp\left(-\int_0^t \lambda_L(\tau) d\tau\right)$$

where variables of the formula have meanings as set forth in the present application.

16. The one or more non-transitory computer-readable media of claim 14 wherein the storage system is an A-way replicated system and the reliability function is computed using a formula, the formula being:

$$\lambda_L(t) = N^A \lambda_F(t; A) p \approx \frac{VN^A}{N^{A-1}} \lambda_F(t; A) = NV \lambda_F(t; A)$$

where variables of the formula have meanings as set forth in the present application.

17. The one or more non-transitory computer-readable media of claim 14 wherein the storage system is an erasure coded system and the reliability function is computed using a formula, the formula being:

$$\frac{NV}{A} \binom{m-1}{A-1} \lambda_F(t; A)$$

where variables of the formula have meanings as set forth in the present application.

18. The one or more non-transitory computer-readable media of claim 12 wherein determining an instantaneous loss rate includes determining $A_F(t; A)$, an instantaneous rate of simultaneous failure of A storage notes at time t, where A storage nodes either fail or are in recovery at time t.

19. The one or more non-transitory computer-readable media of claim 18 wherein $\lambda_F(t; A)$ is determined based on a formula, the formula being:

$$\lambda_F(t; A) = A \sum_{i_1,\ldots,i_A} \left[ f_{j_{i_l}}(t) \prod_{a \neq l} p_{i_a}(t) \right]$$

where variables of the formula have meanings as set forth in the present application.

20. The one or more non-transitory computer-readable media of claim 12 wherein the one or more reliability metrics includes a mean time to data loss (MTTDL).

21. The one or more non-transitory computer-readable media of claim 20 wherein the mean time to data loss is computed based on a formula, the formula being:

$$MTTDL = \int_0^\infty R_Z(t) dt = \int_0^\infty \exp\left(-\int_0^t \lambda_L(\tau) d\tau\right) dt$$

where variables of the formula have meanings as set forth in the present application.

22. The one or more non-transitory computer-readable media of claim 12 wherein the one or more reliability metrics includes a data durability metric that indicates probability that data is safely retained in the storage system over a pre-specified span of time.

\* \* \* \* \*